July 14, 1970 J. FUZZELL ET AL 3,520,294
LABOR CONTRACTION MONITORING SYSTEM
Filed Jan. 26, 1968 3 Sheets-Sheet 1

INVENTORS
Jameso Fuzzell
Weldon R. Sittner
BY
ATTORNEY

July 14, 1970   J. FUZZELL ET AL   3,520,294
LABOR CONTRACTION MONITORING SYSTEM
Filed Jan. 26, 1968   3 Sheets-Sheet 3
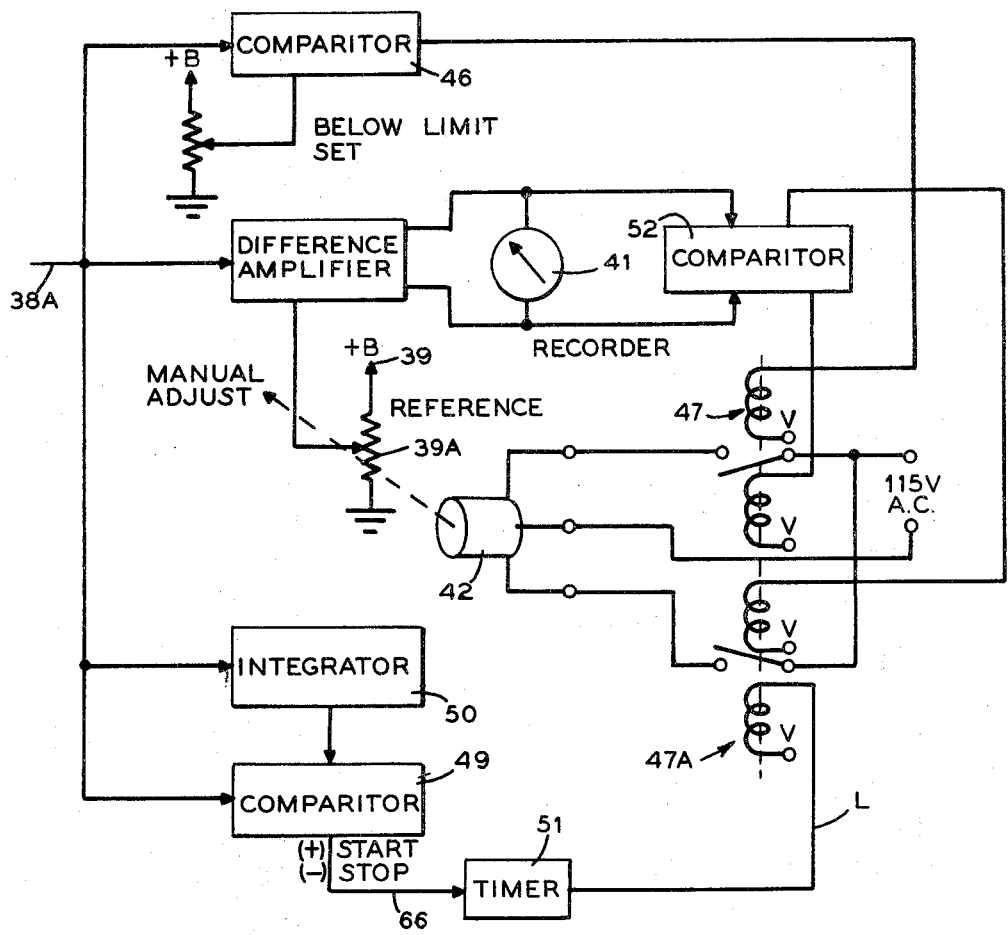
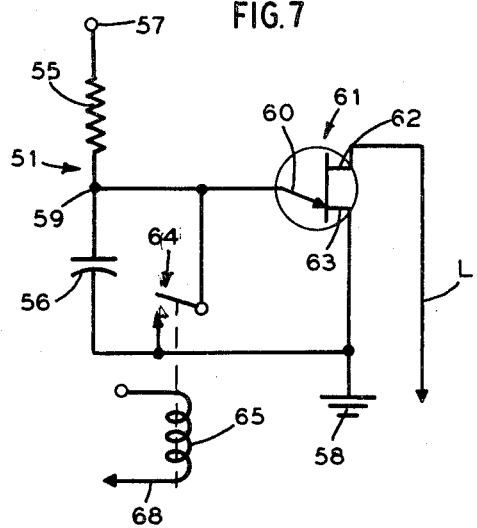

United States Patent Office 3,520,294
Patented July 14, 1970

3,520,294
LABOR CONTRACTION MONITORING SYSTEM
Jameso Fuzzell, Phoenix, Ariz., and Weldon R. Sittner, Westport, Conn., assignors, by mesne assignments, to Electro Medical System, Inc., Englewood, Colo., a corporation of Colorado
Filed Jan. 26, 1968, Ser. No. 700,805
Int. Cl. A61b 5/10
U.S. Cl. 128—2          3 Claims

ABSTRACT OF THE DISCLOSURE

A system for monitoring labor contractions preceding childbirth, including transducer means disposed in contact with the abdomen of the patient for sensing changes in abdominal circumference and translating such linear changes to voltage values in analog form indicative of the amplitude, duration and period of the contractions.

BACKGROUND OF THE INVENTION

It will be quite apparent that a recording of the pattern of uterine contractions during labor of a particular patient is extremely valuable to the attending physician as well as the labor room nurse. Such a record is not only informative as to the progress of the labor contractions, but also affords means for indicating the administration of suitable and timely medication.

Also, such recordings would eliminate the all too common reliance on the patient for establishing the frequency, duration and intensity of contractions; all of which information is vital to a normal and satisfactory outcome of the labor process.

Uterine contractions in labor have been investigated and studied for many years and such investigations have been reported in the literature, see Dodek, Surg. Gyn. Obst. 1932, 55; 45; Alvarez and Caldeyro, Surg. Gyn. Obst. 1950, 91; 1–13. Such known monitoring procedure are (1) of the internal type, where changes in the amniotic fluid pressure is measured by means of a needle inserted in the amniotic sac; or (2) the external type, where strain gauges and the like, are taped to the abdomen of the patient.

While such known monitoring devices, designated as tokodynamometers, are interesting as sources of information relating to the labor process, they have not been adapted for general use by obstetricians as a means for recording the pattern of uterine contractions in a particular patient, so as to optimize the normal outcome of the labor process.

Accordingly, an object of this invention is to provide an improved system for monitoring uterine contractions in labor and recording the amplitude, duration and period of the contractions.

Another object of this invention is to provide a monitoring system of the character described, which includes transducer means readily applied to the abdomen of the patient and which is comfortable and acceptable by the patient.

A further object of this invention is to provide improved transducer means together with means for holding the transducer means against the abdomen of a patient with constant tension so as to provide signals which are a function of the changes in abdominal dimensions.

A further object of this invention is to provide an improved monitoring system of the character described, which affords chart recordings available for reading near the patient or at remote central points; such readings being immediately intelligible to the labor room nurse and the attending physician.

Still another object of this invention is to provide a monitoring system of the character described, which is not influenced or adversely affected by extraneous factors such as respiration, fetal or patient movement, and the like; thereby providing a chart reading which accurately reflects the course of uterine contractions of the particular patient.

Still a further object of this invention is to provide a monitoring system of the character described, which includes a belt type transducer assembly comprising disposable belt and transducer means for ready and quick attachment to a connector portion of the assembly for mounting on the abdomen of the patient; the belt and transducer means after a single use thereof being easily detached from the connector portion, for disposal.

Yet another object of this invention is to provide in a monitoring system of the character described, circuitry means for translating an recording changes in abdominal dimensions with each contraction in labor, in intelligible chart form, and including circuit means for automatically correcting the chart baseline to compensate for long term drifts due to patient and fetal movements.

Yet a further object of this invention is to provide a monitoring system of the character described, which supplies charts of the labor process for ready incorporation in hospital records; and further, is embodied in compact apparatus which is economically feasible for hospital use.

Other objects of this invention will in part be obvious and in part hereinafter pointed out.

BRIEF DESCRIPTION OF THE DRAWINGS

FIG. 6 is a circuit diagram showing baseline adjusting means;

FIG. 7 is a circuit diagram showing details of the timer portion of the circuit diagram shown in FIG. 6.

A DESCRIPTION OF THE PREFERRED EMBODIMENT

The monitoring system of the instant invention comprises essentially a belt type transducer assembly including an elastic portion, which is mounted about the abdomen of the patient; such transducer varying its length with successive uterine contractions, to thereby produce resistance changes; together with circuit means for translating such resistance changes in a manner to drive a recording device which plots the contractions as a function of time.

Figure 5:
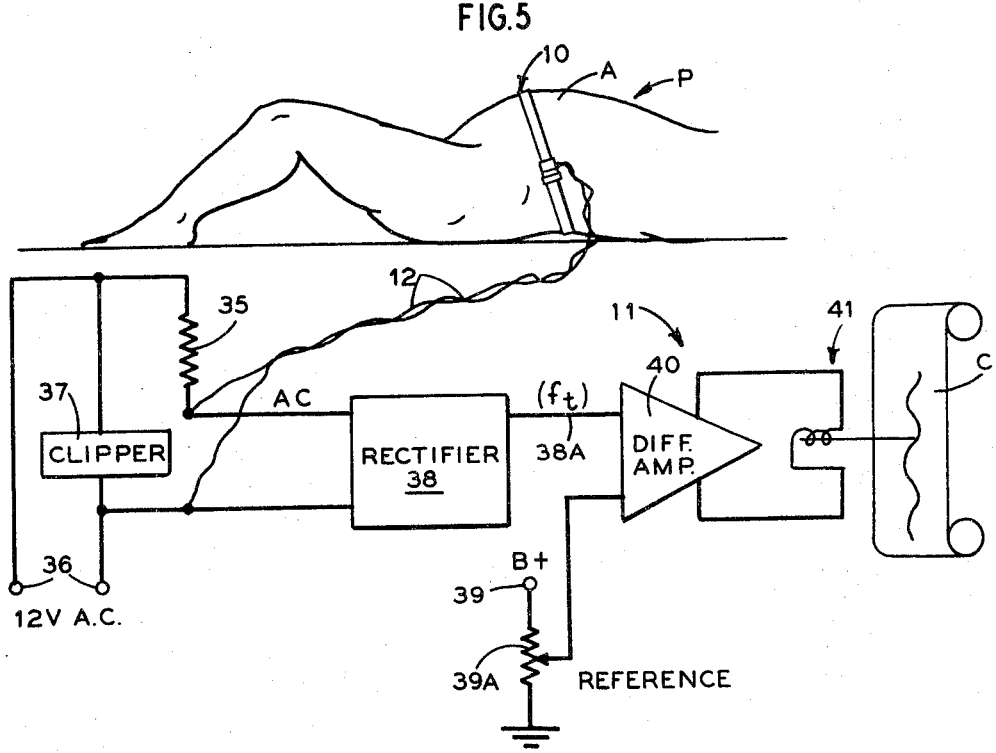
FIG. 5 is a diagrammatic view showing the belt transducer in use; including circuitry connecting the same to recording means.

Thus, as shown in FIG. 5, where the patient is indicated at P; a belt transducer assembly generally indicated at 10 is applied to the abdomen A of patient P; the transducer 10 being connected to recording apparatus generally indicated at 11, by leads 12.

Figure 1:
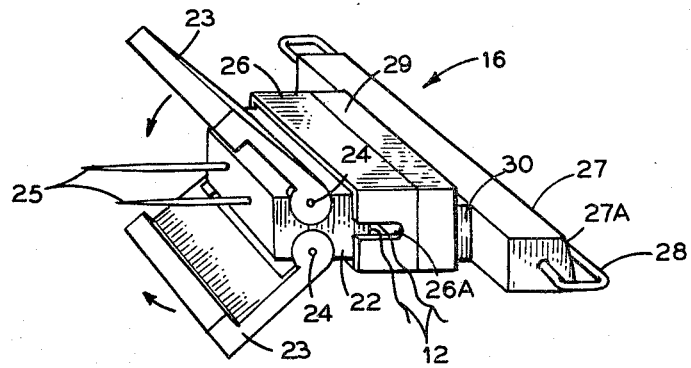
FIG. 1 is a perspective view showing connector means for interconnecting the belt transducer and the electrical signal recording means, embodying the invention.
Figure 2:
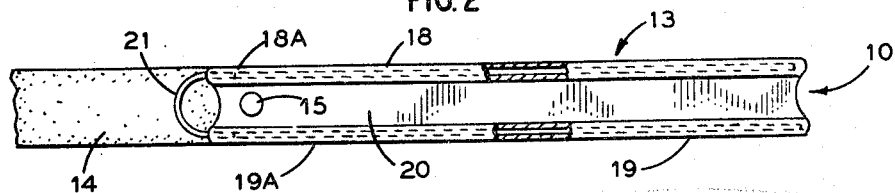
FIG. 2 is a top plan view showing a portion of the belt transducer.
Figure 3:
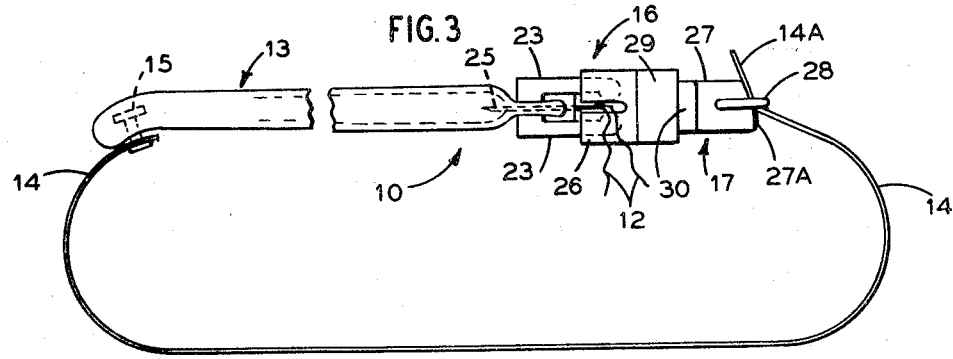
FIG. 3 is a side elevational view showing the complete belt transducer assembly.
Figure 4:
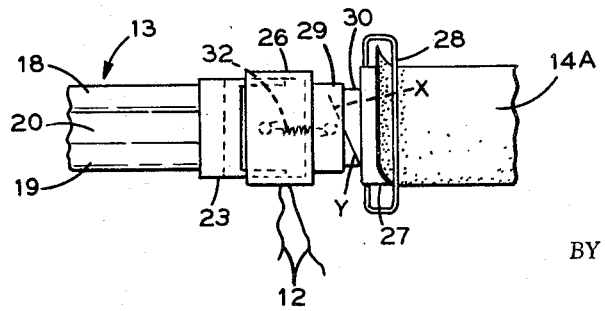
FIG. 4 is a partial top plan view showing the belt transducer and its connection to another portion of the belt assembly.

The belt transducer 10, as shown in FIGS. 2–4, comprises an elastic member 13 and an elongated strong paper member 14 secured together in end to end relation, as by a fastener 15. A connector member generally indicated at 16, is removably connected to the other end of member 13; said connector member 16 including means 17 for releasably engaging and gripping the free end 14A of paper member 14.

The elastic member 13 is formed by extruding natural or synthetic rubber to provide a pair of parallel tubular portions 18, 19 integrally connected by a longitudinally extending, thin web portion 20. The extruded member is cut to suitable length so as to adequately span the abdomen A of patient P.

The tubular portions 18, 19 are filled with an electrolyte such as a 12% aqueous solution of sodium chloride or other suitable electrically conductive salt or other solution. The ends of tubular portions 18, 19 are then sealed by applications of rubber cement or other sealant. The electrolyte in tubular portions 18, 19 is connected serially by a U-shaped stainless steel wire 21 whose terminal ends are sealed into end portions 18A, 19A of tubular portions 18, 19.

The connector member 16 interconnects elastic member 13 and the free end of belt member 14; and further, provides for electrical contact with the electrolyte in tubular portions 18, 19. To this end, connector member 16 comprises a base member 22 having a pair of opposed clamping jaws 23 pivoted thereto as at 24. A pair of parallel, conductive needle probes 25 are fixed in base member 22, extending transversely thereof and located between jaws 23.

The member 22 is disposed adjacent the free end of elastic member 13 with the needle probes 25 aligned with the terminal ends of tubular portions 18, 19 so that said probes may be moved to penetrate said tubular portions to make electrical contact with the electrolyte therein. A hollow retainer member 26 is arranged for slidable movement relative to base member 22 so as to move jaws 23 into clamping relation to the end portion of elastic member 13. A slot 26A in an end wall of retainer member 26 passes wire leads 12 extending from needle probes 25, for connection to the recording apparatus 11.

The free end 14A of paper belt portion 14 is adjustably connected to connector member 16 by way of a transversely extending abutment bar 27 and a U-shaped clamping member 28 with its terminal ends pivotally mounted in the ends of bar 27. The free end 14A of belt portion 14 thus may be tightly clamped against the arcuate surface portion 27A of bar 27 by appropriate pivoted movement of clamping member 28.

Means is provided to assure a constant tension in belt transducer 10 when the same is mounted on the abdomen A of patient P by way of belt portion 14. To this end, a pair of telescopically related members 29, 30 are respectively connected to retainer member 26 and the abutment bar 27; said members 29, 30 being resiliently interconnected by a suitable spring 32. The members 29, 30 carry calibrated diagonal linear markings X, Y. Thus, with the belt transducer 10 in position on the abdomen A of patient P, the free end 14A of belt portion 14 is adjusted relative to abutment bar 27 until markings X, Y are in linear alignment, to provide a constant tension on the belt transducer 10.

Essentially, the leads 12 from needle probes 25 are connected to a voltage divider consisting of a high impedance 35 in series with said leads 12, see FIG. 5. Alternating current from a source 36 of 60 c.p.s. current is used to prevent the migration of ions within the electrolyte carried in tubular portions 18, 19, to the electrode probes 25, with a resulting change in resistance. A voltage amplitude clipper 37 connected across current source 36 will remove the normal fluctuations in voltage of said source, to thereby minimize long term drift in the device.

The alternating voltage appearing across the transducer is rectified at 38 and filtered. The function thus generated is proportional to the changes in the circumference of the abdomen A of patient P and thus is an index of the uterine contractions. Such voltage function is compared to a reference voltage from a source 39, in a difference amplifier 40. The output of the difference amplifier 40 is used to drive a conventional pen recorder 41 which will plot the uterine contractions on a chart C as a function of time.

An automatic baseline correction circuit is shown in FIG. 6. Such a circuit compensates for long term drifts in the system due to patient and fetal movements. Here, the output 38A from rectifier 38 is impressed on one input of difference amplifier 40, as previously described; the reference input from reference source 39 establishes the base line as plotted on chart C, FIG. 8, which shows a typical uterine contraction pattern, plotted against time.

Figure 8:
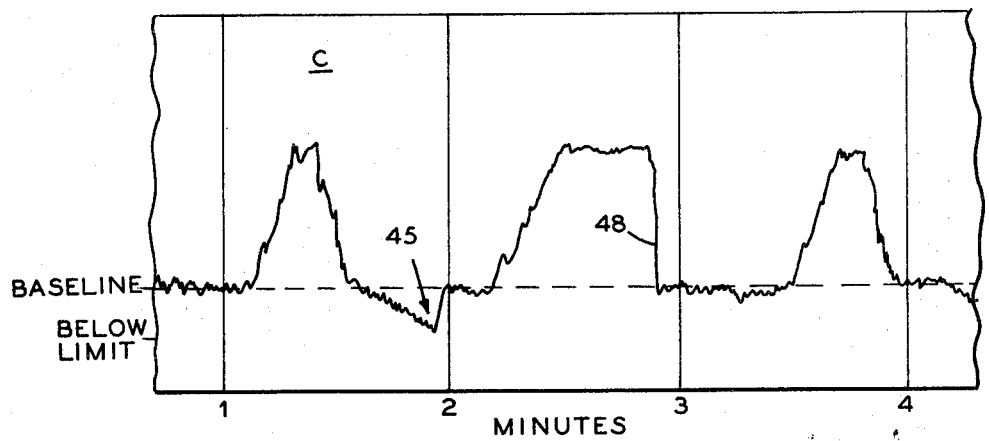
FIG. 8 is a chart showing a typical uterine contraction pattern.

The base line is adjusted manually, or automatically by means of a suitable control system. Thus, as shown in FIG. 8, a reversible motor 42 is mechanically coupled to reference potentiometer 39A which combination represents the controlled element in the system. Such system has three states: (1) Up correction; (2) Down correction; and (3) Off. The Up correction is initiated when the baseline drops below a preset limit 45 on chart C. This limit is established by comparing the function to a reference level in comparator 46. If this level is exceeded, latching relay 47 is closed, to start correction motor 42.

The Down correction is initiated if the baseline drifts above the long-term average for more than 3 minutes, as indicated at 48 on chart C. This logical function is provided by comparing the function in a comparator 49 against its long term average in integrator 50. The output of comparator 49 alternately starts and stops a timer 51, as such output changes from plus to minus; the details of timer 51 being shown in FIG. 7; and hereafter described in detail.

Thus, if the function persists for a time in excess of the preset time within timer 51 (3 minutes), this circuit will time out, activating latching relay 47A, which in turn is effective to start correction motor 42 in the opposite direction to thus adjust the baseline in the opposite direction.

The third state Off, is reached when the control system adjusts the voltage appearing across the recorder 41 to zero. This is the baseline reference. This condition is sensed by a comparator 52, whose output unlatches relays 47, 47A and turns off the correction motor 42.

As shown in FIG. 7, the timer 51 is a free running sawtooth generator comprising a resistor 55 and a capacitor 56 connected in series between potential 57 and ground 58. Their junction 59 is connected to a control electrode 60 of a unijunction transistor 61 whose electrode 62 is connected via line L and a coil of relay 47A to potential V. The electrode 63 is connected to ground.

The normally closed contact set 64 of relay 65 is driven by comparator 49 via line 66. As long as contacts 64 are closed, electrode 62 is at ground potential and transistor 61 does not fire. However, when contacts 64 open, capacitor 56 starts charging and the voltage at junction 59 rises. At a given voltage value, transistor 61 fires, causing current to flow in the circuit from V via the coil of relay 47A, line L and transistor 61 to ground; thereby operating relay 47A. The firing time for transistor 61 is related to the time constant of capacitor 56 and resistor 55.

By way of illustration, the elastic member 13 may have the following dimensions. The tubular portions 18, 19 have an internal diameter of the order of 0.10 inch with a wall thickness of about 0.05 inch. The web 20 may have a thickness of the order of about 0.05 inch and the spacing between tubular portions 18, 19 may be about 0.4 inch.

The retainer member 26 may have a wedging relation to jaws 23 as the same is telescoped over base member 22 to assure a firm connection therebetween. However, the members may be disconnected after use of the transducer 10 to permit removal and replacement of elastic member 13.

We claim:

1. A system for monitoring and recording uterine contractions during labor comprising: elastomeric transducer means applicable to the abdomen of a patient for producing electrical signals proportional to changes in abdominal dimensions, said transducer means comprising an elongated tubular portion, and an electrolyte sealed within said tubular portion, a base member, electrode means extending from said base member into said tubular portion for making electrical contact with the electrolyte therein, first clamping means on said base member for engaging adjacent portions of said tubular portion, belt means secured at one end thereof to portions of said tubular portion remote from the clamped portion thereof, and second clamping means on said base member for adjustably engaging the other end of said belt means, and means interconnecting said first and second clamping means for maintaining a constant tension in said belt means and said tubular portion; means for recording electrical signals; and means for connecting said electrode means to said electrical signal recording means.

2. In a system for monitoring and recording uterine contractions during labor comprising: elastomeric transducer means, said transducer means comprising an elongated tubular portion, an electrolyte sealed within said tubular portion, electrode means extending into said tubular portion for making electrical contact with said electrolyte therein, a high impedance means connected in series with said electrode means, an alternating current source connected across said high impedance means and said electrode means, a difference amplifier having first and second inputs, said first input connected to said electrode means for receiving voltage signals developed by said transducer means, a source of reference voltage, means for connecting said source of reference voltage to said second input, and electrically operated chart forming means driven by the output of said difference amplifier.

3. In a system as in claim 2 and further including means for automatically adjusting the baseline provided by said chart forming means in respect to a preset baseline limit.

References Cited

UNITED STATES PATENTS

| | | | |
|---|---|---|---|
| 2,831,478 | 4/1958 | Uddenberg et al. | 128—2 |
| 3,268,845 | 8/1966 | Whitmore | 128—2.05 XR |

OTHER REFERENCES

Minneu, German Application No. 1,124,631, Mar. 1, 1962, 1 sht. drug., 3 pps. spec.

WILLIAM E. KAMM, Primary Examiner

U.S. Cl. X.R.

338—47